(12) United States Patent  
Park

(10) Patent No.: US 6,226,442 B1
(45) Date of Patent: May 1, 2001

(54) HIGH SPEED COPYING SYSTEM FOR DOUBLE-DECK COMPLEX VIDEO APPARATUS

(75) Inventor: Hee-Moon Park, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 08/870,181

(22) Filed: Jun. 6, 1997

(30) Foreign Application Priority Data

Jul. 19, 1996 (KR) .................................................. 96-29419

(51) Int. Cl.[7] ...................................................... H04N 5/91
(52) U.S. Cl. ........................... 386/46; 386/46; 360/15; 369/84
(58) Field of Search ............................. 386/1, 4, 46, 52, 386/53, 54, 55, 56, 57, 58, 59, 60, 61, 62, 63, 64; 360/13, 15; 369/83, 84, 85

(56) References Cited

U.S. PATENT DOCUMENTS 5,083,225 * 1/1992 Morisaki et al. ....................... 360/15
5,493,414 * 2/1996 Inoue et al. ............................ 386/52
5,715,104 * 2/1998 Takada et al. ......................... 386/52

* cited by examiner

Primary Examiner—Chris Kelley
Assistant Examiner—Christopher Onuaku
(74) Attorney, Agent, or Firm—Dilworth & Barrese, LLP

(57) ABSTRACT

Disclosed is a high speed copying system for use in a double-deck video apparatus, which includes a system controller responsive to input copy speed data for generating control signals that generally control operation of the system. First and second switches are responsive to at least one of the control signals supplied from the system controller for supplying power to first and second recording heads. First and second filters are used to filter an output signal picked up by a pick-up means in response to one of the control signals relating to a copy mode from the system controller. Each filter has a passband that includes a frequency $Nf_c$, where N is a number related to copy speed and $f_c$ is a reference carrier frequency. Automatic gain control circuits may be used to automatically control gain of the signals output from the respective filters for application to the recording heads. Optionally, the first and second filters may be band pass filters with a variable passband according to the copy speed.

12 Claims, 1 Drawing Sheet

HIGH SPEED COPYING SYSTEM FOR DOUBLE-DECK COMPLEX VIDEO APPARATUS

BACKGROUND OF THE INVENTION

1. Field of the Invention

The present invention relates generally to audio and video recording, and more particularly, to a high speed copying system for a double-deck complex video apparatus.

2. Description of the Prior Art

Generally, a double-deck video cassette recorder has at least two video cassette decks capable of tape-to-tape copying of video data therebetween, where one deck is set to a playback mode, and the other deck is set to a record mode.

As shown in FIG. 1, a conventional double-deck complex video apparatus includes an amplifier 1 for amplifying a signal picked up through a playback head PB, a demodulator 2 for demodulating the amplified signal of the amplifier 1 into an original signal, a modulator 3 for modulating the signal demodulated in the demodulator 2, and an automatic gain control (AGC) circuit 4 for controlling gain of the signal modulated in the modulator 3.

First, to copy high fidelity (Hi-Fi) tape using the above double-deck apparatus, if the tape is set within the playback deck, the FM audio signal picked up by the playback head PB is amplified through the amplifier 1, and then, the amplified signal is demodulated by the demodulator 2 as the original signal. The original signal is then input to the modulator 3, and is modulated as a proper signal for recording. Thereafter, the signal gain of the modulated signal is controlled by AGC circuit 4, and is recorded on the tape.

To copy data recorded on the first recording media received in the first deck to the second recording media received in the second deck, for the case in which relevant data is selected, the FM audio signal picked up by the playback head PB is amplified through the amplifier 1 at a predetermined level, and then, the amplified signal is demodulated by the demodulator 2 as the original signal. The original signal is modulated by the modulator 3 as the modulated signal which is applied through AGC circuit 4 to the recording head REC to be recorded on the recording media.

In a conventional copying procedure, since data copying must be performed through the demodulating and modulating procedures, if data is copied at N times a reference speed, the carrier frequency increases by a factor of N so that the degradation occurs in the modulator and the demodulator.

Another conventional FM audio signal copying method in the prior art employs head switching. Typically, the head switching type of copying method exhibits undesirable switching noises.

SUMMARY OF THE INVENTION

Accordingly, it is an object of the present invention to provide a high speed copying system for a double-deck complex video apparatus which avoids modulator/demodulator-related degradation effects, and which exhibits low or minimal switching noises.

In an exemplary embodiment of the present invention, a high speed copying system for use in a double-deck video apparatus includes a system controller responsive to input copy speed data for generating control signals that generally control operation of the system. First and second switches are responsive to at least one of the control signals supplied from the system controller for supplying power to first and second recording heads. First and second filters are used to filter an output signal picked up by a pick-up means in response to one of the control signals relating to a copy mode from the system controller. Each filter has a passband that includes a frequency $Nf_c$, where N is a number related to copy speed and $f_c$ is a reference carrier frequency. Automatic gain control circuits may be used to automatically control gain of the signals output from the respective filters for application to the recording heads.

Optionally, the first and second filters may be band pass filters with a variable passband according to the copy speed.

The copying system may include a third filter for filtering an output signal picked up from a playback head, where the third filter has a passband that includes the reference carrier frequency $f_c$.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings.

DETAILED DESCRIPTION OF PREFERRED EMBODIMENTS

Reference will now be made in detail to preferred embodiments of the present invention, examples of which are illustrated in the accompanying drawings.

Figure 1:
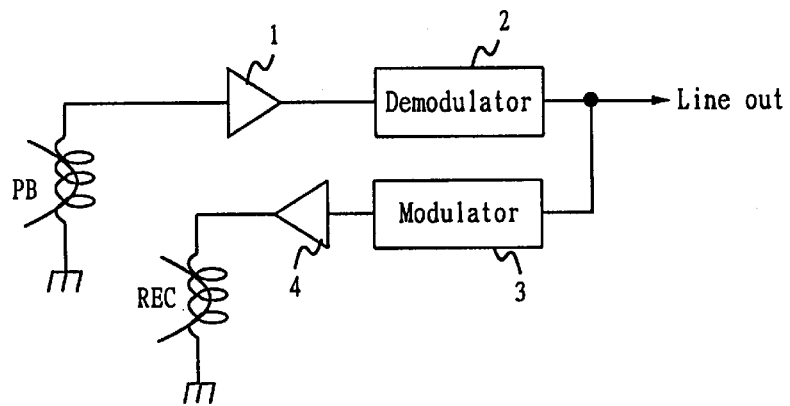
FIG. 1 is a block diagram of a conventional copying system for a double-deck complex video apparatus.
Figure 2:
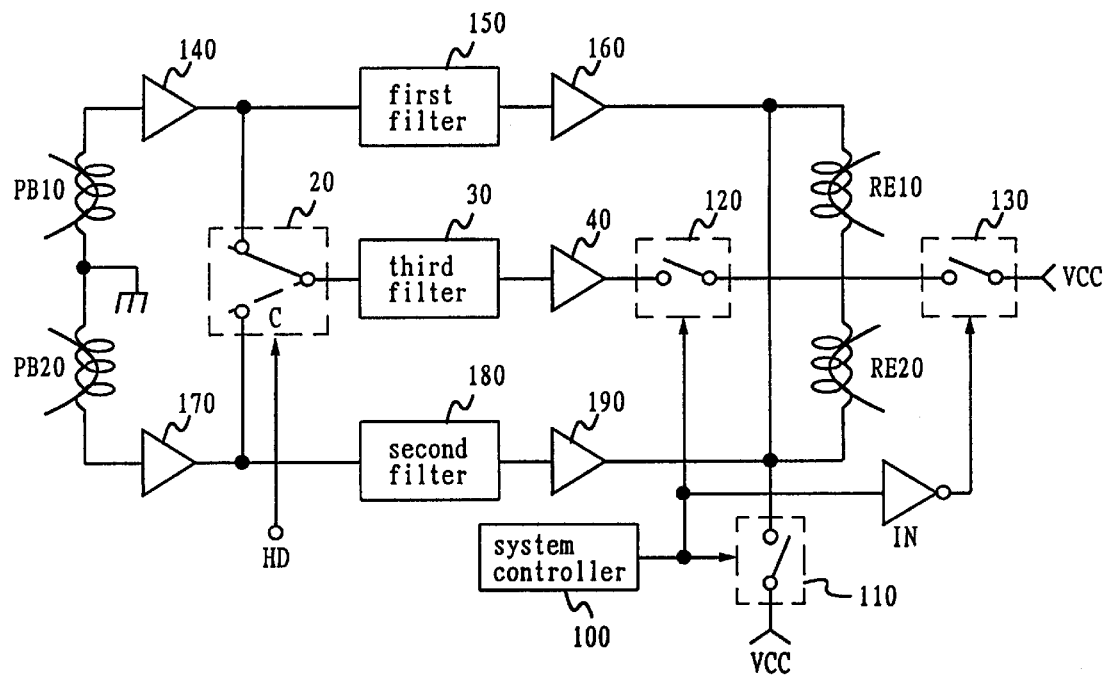
FIG. 2 is a block diagram of a high speed copying system for a double-deck complex video apparatus according to a preferred embodiment of the present invention.

Referring to FIG. 2, a high speed copying system for a double-deck complex video apparatus according to a preferred embodiment of the present invention is disclosed. The apparatus includes a system controller 100 which receives data for determining a copy speed of the video apparatus, i.e., "copy speed data". When controller 100 receives such data, it generates control signals for controlling operation of the copying system. In response to a control signal supplied from system controller 100 according to a selected copy speed, first and second switching circuits 110 and 120 are switched to supply power to recording heads RE10 and RE20.

First and second filters 150 and 180 are each comprised of a bandpass filter having a passband centered at a frequency $Nf_c$, which is N times a reference carrier frequency $f_c$. Filters 150, 180 thereby filter the output signal picked up by pick-up means comprising playback heads PB10 and PB20. Filters 150 and 180 are responsive to control signals provided by controller 100 relating to a copy mode, and the filtering band of each filter 150,180 is variable according to the copy speed data input to a data input means (not shown). A third filter 30 is comprised of a bandpass filter having a passband centered about the reference carrier frequency $f_c$, for filtering the signal output from a third switching circuit 20. Switching circuit 20 selects the picked-up signals through first and second playback heads PB10 and PB20 in response to a head switching pulse HD.

Automatic gain control (AGC) circuits 40, 160, and 190 each automatically control gain of the signal output from the respective filter 30, 150 or 180. The AGC outputs are applied to recording heads RE10 and RE20. The second switching circuit 120 is switched in response to a predetermined control signal from the system controller 100 to enable the output signal from the third filter 30 to be applied to the recording heads RE10 and RE20 via AGC 40.

Operation of the embodiment of FIG. 2 will now be described in further detail. If the input copy speed data indicates a "one times speed" selection (i.e., in which data recorded on a first recording media received in a first deck is to be copied to a second recording media received in a second deck at one times speed) the system controller 100 generates a high-level signal which is supplied to switching circuits 110 and 120 to close the switches. Switching circuits 110 and 120 are each comprised of an analog switch.

When the first and second switching circuits 110 and 120 are turned on, the picked-up signals from the playback heads PB10 and PB20 are supplied, through the third switching circuit 20 which is turned on by the head switching pulse HD, to the third filter 30, which is a band pass filter with respect to NTSC L-CH: 1.3 MHz, and R-CH: 1.7 MHz. After the carrier frequency is filtered by the third filter 30, the picked-up signal is applied through AGC circuit 40 and the second switching circuit 120 to the recording heads RE10 and RE20, so that the picked-up data from the first recording media of the first deck is copied to the second recording media of the second deck.

When the input copy speed data corresponds to a "N times speed" selection (in which data recorded on the first recording media received in the first deck is to be copied to the second recording media received in the second deck at N times a reference speed) a low level signal output from the system controller 100 is applied to switching circuits 110 and 120. At the same time, this low-level signal is applied to the fourth switching circuit 130 through the invertor IN, so that only the fourth switching circuit 130 is turned on.

Thus, if the first and second switching circuits 110 and 120 are turned off and the fourth switching circuit 130 is switched on, the signals are picked up from the playback heads PB10 and PB20 at N times speed and, each is filtered through the first and second band pass filter 150 and 160, so as to pass the frequency band centered about $Nf_c$, where $f_c$ is the reference carrier frequency. Then, the picked-up signal at frequency $Nf_c$ is applied through the automatic gain control circuits 160 and 190 to the recording heads RE10 and RE20, so that the picked-up data from the first recording media of the first deck is copied to the second recording media of the second deck at N times speed.

According to the present invention as described above, when copying data recorded on the first recording media received in the first deck to the second recording media received in the second deck at N times speed, since modulating and demodulating procedures are omitted by applying the picked-up signal to the recording head after extraction of only the carrier frequency (and the information modulated thereon) from the picked-up signal, the degradation occurring in the modulator and demodulator is avoided.

While the invention has been described in conjunction with specific embodiments thereof, it is evident that several alternatives, modifications, and variations will be apparent to those skilled in the art in light of the foregoing description. Accordingly, it is intended to embrace all such alternatives, modifications, and variations as fall within the spirit and broad scope of the following claims.

What is claimed is:

1. A high speed copying system for use in a double-deck video apparatus comprising:

a system controller responsive to input copy speed data for generating control signals that generally control operation of the system;

first and second switching means responsive to at least one of the control signals supplied from the system controller for supplying power to first and second recording heads;

first and second filter means for filtering an output signal picked up by a pick-up means in response to one of the control signals relating to a copy mode from the system controller, each filter means having a passband that includes a frequency $Nf_c$, where N is a number related to copy speed and $f_c$ is a reference carrier frequency; and automatic gain control means for automatically controlling gain of the signals output from the respective filter means for application to the recording heads.

2. A system according to claim 1, wherein each of the first and second switching means is switched in response to one of said control signals supplied from the system controller according to a selected copy speed to supply power to the recording heads.

3. A system according to claim 1, wherein each of the first and second filter means comprises a band pass filter having a passband centered about $Nf_c$, for filtering out frequencies of the output signal outside the passband.

4. A system according to claim 3, wherein a filtering band of each of the first and second filter means is variable according to the copy speed.

5. A system according to claim 1, wherein said pick-up means comprises first and second playback heads, and said system further comprising a switch for selecting any one of signals picked up from said first and second playback heads in accordance with a head switching pulse, and said system further including third filter means comprising a band pass filter having a passband including said carrier frequency $f_c$.

6. A system according to claim 5, further including an automatic gain control (AGC) circuit for controlling gain of a signal output from said third filter means, and a fourth switching means coupled to an output of said AGC circuit.

7. A system according to claim 1, wherein each of the first and second switching means comprises an analog switch.

8. A high speed copying system for a double-deck video apparatus comprising:

a system controller for outputting data for controlling operation of the system in response to input data;

first and second playback heads for reading media;

a plurality of filtering means for filtering each carrier frequency included in a signal output from the first and second playback heads when controlling data which corresponds to a high speed copy mode are output from the system controller, modulating and demodulating procedures not being applied to the signal output from the first and second playback heads; and recording means for recording the signal output from the first and second playback heads and filtered by the plurality of filtering means, to media.

9. A system according to claim 8, wherein said plurality of filtering means comprise a plurality of band pass filters, each having a variable passband controlled by said system controller in accordance with copy speed.

10. A system according to claim 8, further comprising a plurality of automatic gain control circuits coupled between said plurality of filtering means and said recording means.

11. A system according to claim 8, further comprising first and second switches responsive to at least one control signal of said system controller for supplying power to said recording means.

12. A high speed copying system for use in a double-deck video apparatus comprising:

a system controller for outputting data for controlling operation of the system in response to input data;

first and second playback heads for reading media;

a plurality of band pass filters for filtering each carrier frequency included in a signal output from the first and second playback heads when controlling data which corresponds to a high speed copy mode are output from the system controller, modulating and demodulating procedures not being applied to the signal output from the first and second playback heads; and a plurality of recording heads for recording the signal output from the first and second playback heads and filtered by the plurality of band pass filters, to media.

* * * * *